Figure 1:
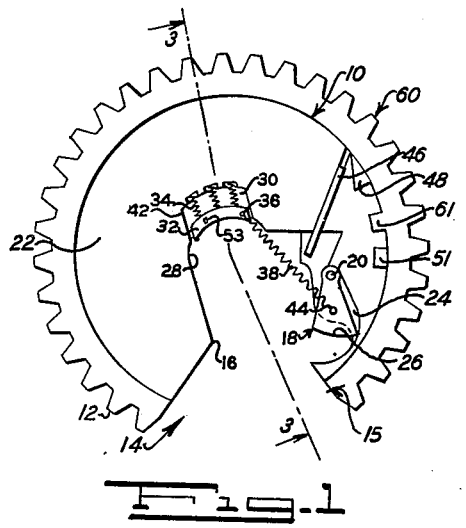

Oct. 23, 1962 H. J. DAUGHERTY ET AL 3,059,512
TUBE ROTATING APPARATUS
Filed Sept. 4, 1959

INVENTORS
HENRY J. DAUGHERTY
ROBERT E. MAXWELL

BY *Mason, Mason & Albright*
ATTORNEYS

United States Patent Office 3,059,512
Patented Oct. 23, 1962

3,059,512
TUBE ROTATING APPARATUS
Henry J. Daugherty, 11401 Roth Drive, and Robert E. Maxwell, 745 Wainwright, both of Houston, Tex.
Filed Sept. 4, 1959, Ser. No. 838,233
3 Claims. (Cl. 81—97)

This invention relates to a tool for rotating a tube or other cylindrical objects, and it is adapted particularly as a tool for holding and rotating a pipe section for the purpose of screwing or unscrewing one pipe section to another in the oil well industry, although the invention is not limited to the oil well art. The tool of this invention when used in the oil well industry may also be used for connecting or disconnecting sections of tubing casings or rods.

The principal object of the invention is to provide a tool of this type that is composed essentially of two parts, viz. a bowl or ring-shaped member and a pivoted jaw of a particular construction whereby a section of pipe or other cylindrical member can be tightly gripped and rotated without injury thereto.

A further object is the provision of gripping mechanism having sufficient compressive force to grip the tube securely by evenly applying the gripping force over a greatly increased bearing or gripping area of the pipe and over a sufficient bearing area to prevent damage to the pipe during its screw-threaded connection or disconnection to or from a string of pipe.

Another object is to provide means for connecting cylindrical members to each other such as tubes, casing, pipes or rods by screw-threaded engagement, in such manner as will enable the work to be accomplished more simply and expeditiously than with types of equipment heretofore available, and with a minimum of hazard to the operators handling such apparatus.

A further object is to provide a tool of this type which insures that sufficient compressive force is always present, with the pipe or rod being gripped substantially about 180° of its circumferential surface, whereby the compressive force on the pipe is spread over a sufficient area so that the collapse resistance, viz. the elastic limit of the metal of which the pipe is composed, is not exceeded.

Another object is to provide a pivoted jaw having a face of novel configuration whereby when the face initially contacts the pipe surface, the pipe is rolled inwardly of the bowl due to the frictional engagement of the pipe by the pivoted jaw.

An additional object is to provide a pivoted jaw in a device of the kind described, the radii of whose gripping face from the pivoted support thereof constantly increases from the side of the face which initially contacts the pipe as it moves into the bowl, to the other side of the face of said jaw. This latter side of the jaw face which has the longest radius is that portion which grips the pipe during the rotation of the pipe.

Another object is to provide means mounted in the bowl for causing the pivoted jaw to move automatically into engagement with the tube or rod as the apparatus and tube are moved relative to each other to cause the tube to be seated in the bowl recess whereby the operator may immediately apply power from the prime mover to speed up the overall work of connecting a string of pipes or tubes to each other.

A further object is to provide automatic positive means for opening the pivoted jaw when the bowl is rotated in the opposite direction for releasing the pivoted jaw from the tube or rod following the operation of connecting the tube or rod to a string of tubing or rods.

Other objects will appear hereinafter throughout the specification.

Figure 2:
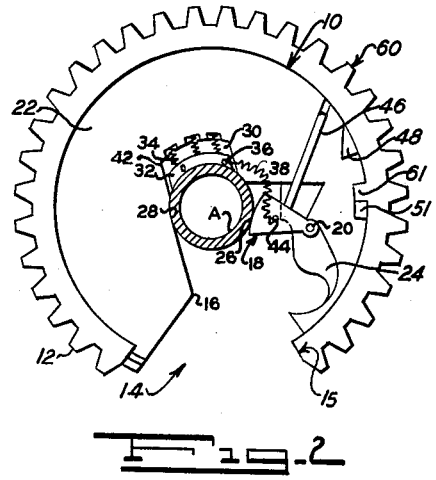
Figure 3:
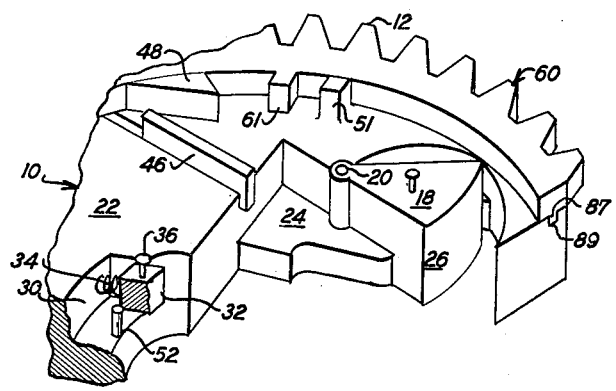
Figure 4:
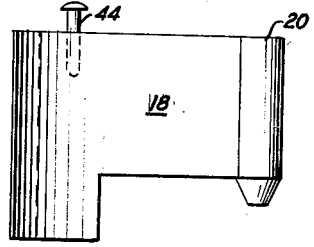
Figure 6:
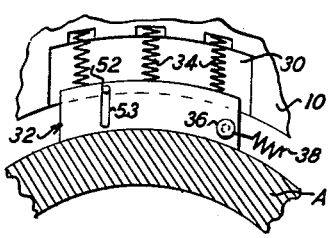
Figure 5:
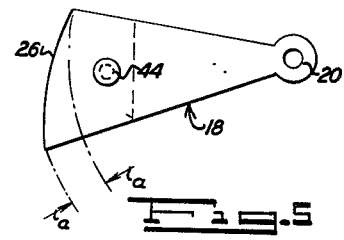

In the drawings:
FIGURE 1 is a top plan view partially in section, minus the driving means therefore, with the parts in non-gripping position;
FIGURE 2 is a view similar to FIGURE 1, with the parts in pipe-gripping position on the pipe;
FIGURE 3 is a sectional view taken on lines 3—3 of FIGURE 1;
FIGURE 4 is a side elevational view of the pivoted jaw;
FIGURE 5 is a top plan view of the structure shown in FIGURE 4; and
FIGURE 6 is an enlarged cross-sectional detail view, partly broken away, of the pipe and bowl.

It will be understood that the term "bowl" in the specification and claims includes an open ring, or even one of the jaws of pipe tongs or a wrench, or that of a rotary table. In the following description, the invention will be described for illustrative purposes only in connection with oil well apparatus including mechanisms for rotating casings or drill pipes. It may be used with slips or in substitution thereof in a rotary drill table, or incorporated as the gripping mechanism for screwing or unscrewing or "breaking" pipe sections. When used as a component part of a wrench or of pipe tongs, rotation of the pipe in one direction may be accomplished by using the device in the position shown in FIGURE 2, but in order to reverse the rotation of the pipe, the apparatus may be removed from the pipe and turned upside down, whereupon it may be caused to again grip the pipe for rotation in the opposite direction for unscrewing the pipe sections from each other.

Referring now to the drawings, 60 shows a ring provided with peripherally arranged teeth 12 whereby to rotate the bowl 10 from driving means not shown, the bowl and ring having openings 14 and 15, respectively. The ring and bowl are relatively rotated with reference to each other, as set forth hereinafter, and may be readily incorporated into any one of the structures of the prior art, such as Helm 1,200,612 granted Oct. 10, 1916; Grable 2,311,225 granted Feb. 16, 1943; Stone 2,615,682 granted Oct. 28, 1952; Ball 2,739,790 granted Mar. 27, 1956; Province 2,780,950 granted Feb. 12, 1957; or Mason 2,846,909 granted Aug. 12, 1958. When using a split ring as shown, a section having teeth may be pivoted to one of the sides so as to swing outwardly where it is desired to open the ring and release the pipe. In place of a pivoted section, a tongue and groove connection may be present between a removable section and the open sides of the ring. The construction of the pivoted or removable section is well known in the art of pipe rotating devices and for this reason has not been illustrated, a removable section being shown in our co-pending application hereinafter referred to.

The opening 14 on the bowl 10 is provided with an inwardly extending wall portion 16, which forces the pipe A during its insertion toward the right of the opening 14 as viewed in FIGURE 2. This places the pipe in position for ready engagement by the pivoted jaw 18.

The pivoted jaw 18 is mounted on a pivot 20 in bowl 10 and is adapted to move from a non-gripping position as shown in FIGURE 1 to the gripping position as shown in FIGURE 2. Bowl 10 is provided with an inner portion 22, and forming a part thereof is a shelf or stepped portion 24 which serves to support the pivoted jaw in both its open and closed positions as shown in FIGURES 1, 2 and 3.

The gripping face 26 of the pivoted jaw 18, as shown in FIGURE 5, is formed on an arc of decreasing radii from the lower end to the upper end thereof as viewed in said figure. The difference in length of radii is indicated by the arrows a–a in FIGURE 5, and the length of increase of radii depends on the size of the pivoted jaw, and the diameter of the pipe A. This difference in length of radii of the surface 26 to pivot 20 is such as to cause the pipe to be firmly wedged in the bowl recess 28 in such manner as to prevent relative rotation between the bowl and the pipe. The tendency of the pipe A to slip is increasingly resisted as the jaw rotates clockwise, as seen in the figures, thus causing the face 26 to wedge itself more firmly against the outer surface of the pipe.

The semi-circular gripping opening 28 of the bowl has a recess 30 for the reception of a trigger or shoe 32. This shoe is normally urged outwardly from the opening by coil springs 34. Connected at post 36 to the shoe is one end of a spring 38, the other end of which is connected to post 44 on jaw 18. When the shoe 32 is forced against the action of springs 34 into recess 30 by engagement with a pipe, spring 38 is placed under tension, causing the jaw 18 to rotate in a clockwise direction into engagement with pipe A. Spring 38 is not shown in FIGURE 3 for the purpose of clarity.

When it is desired to free the pipe A from its engagement by the jaw 18, the ring 60 is rotated counterclockwise as viewed in FIGURE 2 for a part of a revolution. Secured in a recess in the bowl is a rod 46 having one of its ends in engagement with the pivoted jaw 18 when the parts are as shown in FIGURE 2. Rotation of the bowl in a counterclockwise direction will cause the other end of the rod 46 to engage an adjustable cam 48 that is mounted on the ring 60. This rotation will cause the rod 46 to force the jaw 18 to rotate or move in a counterclockwise direction, thus freeing the jaw from engagement with pipe A.

As can be seen in FIGURE 6, the shoe or trigger 32 is actually a sliding bar which has a slot 53 which receives dowell pin 52 which, in turn, extends from bowl 10 from below the trigger 32. This slot 53 in cooperation with dowell pin 52 serves as a guide to insure that movement of trigger 32 is in the correct direction. A second guide 42 is provided in the form of a rectangular recess into which the end of the trigger 32 has been inserted. As the trigger 32 is depressed by the incoming pipe, the positioning springs 34 are compressed. The inward movement of the trigger 32 causes the spring 38 to go into tension and this in turn causes the jaw to move inward on its pivot 20. It should be noted that because the jaw is freely pivoted, very little force is needed to cause it to swing through the small arc until contact with the pipe is made. Thus it is realized that the spring 38 will immediately go back into compression as the jaw starts to move. Due to the type of spring used, this is fully possible and practical. Once initial contact between the pipe and the jaw is made, then power is applied to the apparatus and it is turned. The design of the jaw face is such that the frictional force present is sufficient to cause the apparatus to grip the pipe at once, and the action previously described takes place. Normally a cover is provided to protect the trigger and related parts from damage. This cover is simply a false bottom for the bowl. It has not been shown in the drawings inasmuch as it is not important to the inventive concept involved. However, in practice normally, such a cover would be attached by screws or bolts to the underside of the bowl.

The unlocking mechanism is shown in FIGURE 1. The bowl 10 and the gear ring 60 are two separate parts capable of limited rotation with relation to each other. A cam 48 is fixed on the gear ring 60 and the rod 46 is inserted in a recess in the bowl as shown in FIGURE 1. In addition there are two driving blocks 51 and 61, one 51 fixed to the bowl, and one 61 fixed to the gear ring 60, see FIGURE 1. When a piece of pipe is being made up and the apparatus is turning in a clockwise direction, as in FIGURE 2, the two driving blocks 51 and 61 are in contact, insuring that bowl and gear ring are not moving in relation to each other, but both rotating as one, and the pipe is rotated. When the pipe has been screwed to another pipe sufficiently tight, the bowl is very firmly locked onto the pipe by its compressive grip. In order to release it, the direction of rotation is reversed (by reversing the motor or by gears, driving gear 12). This partial rotation causes the locking blocks to separate as the ring moves, but the bowl and its assembly does not rotate. This is shown in FIGURE 1. The cam 48 on the gear ring now comes into contact with the end of the rod 46 and forces it to move in against the side of the jaw 18. Continued movement of the gear ring with relation to the bowl causes further inward movement of the bar, forcing the jaw to swing along the shelf 24. It should be noted that as along as the ring and bowl are moving together, there is no action between the cam and the rod so that neither of them need to be removed from their positions at any time. An important feature of the cam and the cam end of the rod is that their slant is such that the bar 46 is forced to travel a sufficient distance to free the jaw before the two surfaces of rod 46 and cam 48 clear each other.

The means for mounting the bowl in the geared ring is shown in FIGURE 3. The height of the apparatus is approximately 10 inches over-all. The ring 60 and bowl 10 are provided with a tongue and groove connection, as seen at 87 and 89 in FIGURE 3, so as to keep them in relative alignment.

It is to be distinctly understood that the term "tube rotating apparatus" in the title, specification and claims is intended to be construed to include a starting and stopping device for a cylindrical member such as a tube rotating apparatus, hand wrenches, brakes, rotary tables for oil and other types of well drills, tubing tongs, casing tongs, drill pipe tongs, single and double acting clutches, chucks, rotary slips and all structures for gripping tubes, drums such as brake and clutch drums and other cylindrical objects. It will be further understood that the gripping surfaces of the jaws may or may not be provided with gripping teeth, depending to some extent at least on the use to which the device is to be put and the size and thickness of the tube walls. The drawings and description are furnished for illustrative purposes, applicants being limited only to the extent set out in the appended claims.

The extensive gripping surface 26 in a vertical direction which may be 12 to 24 inches, provides a positive grip over an extended distance and an extensive gripping surface on the pipe. No teeth are used on this jaw gripping surface 26.

The above description and drawings disclose several embodiments of the invention, and specific language has been used in describing the several figures. It will, nevertheless, be understood that no limitations of the scope of the invention are thereby contemplated, and that various alterations and modifications may be made such as would occur to one skilled in the art to which the invention relates.

This invention is an improvement of our application Serial No. 809,168, filed April 27, 1959.

We claim:

1. A tube gripping and rotating apparatus comprising a bowl, a ring movably connected to said bowl, said ring having means thereon for rotating same, means for limiting the relative movement between said ring and said bowl, a jaw pivotally supported by said bowl, a tube gripping surface included in said bowl, means connecting said tube gripping surface with said jaw whereby when a tube engages said tube gripping surface said jaw is moved into gripping engagement with said tube, means on said jaw for increasing the pressure of engagement of said tube gripping surface as said ring is rotated in one direction by said ring rotating means, cam means included on said ring, and connection means cooperating with said cam means and said jaw whereby when said ring is rotated in a direction opposite to that mentioned above, said connection means is actuated to disengage said jaw from said tube.

2. A tube gripping and rotating apparatus comprising a bowl, a ring movably connected to said bowl, said ring having means thereon for rotating same, means for limiting the relative movement between said ring and said bowl, a jaw pivotally supported by said bowl in a position opposed to said tube gripping surface, a tube gripping surface movably received in said bowl, means connecting said tube gripping surface with said jaw whereby when a tube engages said gripping surface said jaw is moved into gripping engagement with said tube, an eccentric face on said jaw for increasing the pressure of engagement of said tube gripping surface as said ring is rotated in one direction by said tube rotating means, cam means on said ring, and connection means cooperating with said cam means and said jaw whereby when said ring is rotated in a direction opposite to that of above, said connection means is actuated to disengage said jaw from said tube.

3. A tube gripping and rotating apparatus comprising a ring having means thereon for rotating same, a tube gripping means included in said ring, a jaw, means for pivotally supporting said jaw on said ring, a shoe movably included in said tube gripping means, resilient means interposed between said shoe and said tube gripping means whereby said shoe is urged against a tube engaged in said tube gripping means, connection means between said shoe and said jaw for moving said jaw into gripping engagement with a tube in response to engagement of said tube with said shoe against said resilient means, and an eccentric face on said jaw for increasing the pressure of engagement of said tube gripping surface as said ring is rotated in one direction by said ring rotating means.

References Cited in the file of this patent
UNITED STATES PATENTS

| | | |
|---|---|---|
| 1,471,367 | Thrift | Oct. 22, 1923 |
| 2,525,213 | Tietze | Feb. 3, 1925 |
| 2,263,267 | Franklin | Nov. 18, 1941 |
| 2,286,099 | Lange et al. | June 9, 1942 |
| 2,311,225 | Grable | Feb. 16, 1943 |
| 2,329,196 | Hambly | Sept. 14, 1943 |
| 2,805,593 | Darrow | Sept. 10, 1957 |